United States Patent
Srivastava et al.

(10) Patent No.: US 12,393,854 B2
(45) Date of Patent: Aug. 19, 2025

(54) SYSTEM AND METHOD FOR IMPLEMENTING AN APPLICATION PREDICTION ENGINE

(71) Applicant: JPMorgan Chase Bank, N.A., New York, NY (US)

(72) Inventors: Amar Srivastava, Morris Plains, NJ (US); Alexander N. Torres, Jersey City, NJ (US); Srinivasan Gopalakrishnan, Belle Mead, NJ (US); Rohit Goldsmith, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1165 days.

(21) Appl. No.: 17/227,919

(22) Filed: Apr. 12, 2021

(65) Prior Publication Data

US 2021/0319349 A1    Oct. 14, 2021

Related U.S. Application Data

(60) Provisional application No. 63/008,027, filed on Apr. 10, 2020.

(51) Int. Cl.
| | | |
|---|---|---|
| H04L 67/62 | (2022.01) | |
| G06F 16/2455 | (2019.01) | |
| G06F 16/903 | (2019.01) | |
| G06F 16/957 | (2019.01) | |
| G06N 7/01 | (2023.01) | |
| G06N 20/00 | (2019.01) | |
| H04L 67/306 | (2022.01) | |
| H04L 67/5682 | (2022.01) | |

(52) U.S. Cl.
CPC .......... *G06N 7/01* (2023.01); *G06F 16/90335* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2008/0147971 A1* | 6/2008 | Hawkins | A63F 13/00 711/E12.017 |
| 2017/0315917 A1* | 11/2017 | Yamamoto | G06F 12/0862 |
| 2019/0163664 A1* | 5/2019 | Karani | G06F 15/17331 |
| 2020/0250096 A1* | 8/2020 | Dias | G06F 3/0671 |

* cited by examiner

*Primary Examiner* — Mustafa A Amin
(74) *Attorney, Agent, or Firm* — GREENBLUM & BERNSTEIN, P.L.C.

(57) ABSTRACT

An embodiment of the present invention is directed to dynamic caches that handle a large request load using limited resources. An embodiment of the present invention is directed to exploring forecasting request loads to provide an optimal cache based of historical data. For example, the prediction engine may first forecast the most likely requests for the next day. Then, the timing of those requests may be forecasted. Optimization may be performed on the forecasted request load to provide an appropriate cache based on user priority and/or content size of the payload.

20 Claims, 6 Drawing Sheets

SYSTEM AND METHOD FOR IMPLEMENTING AN APPLICATION PREDICTION ENGINE

CROSS REFERENCE TO RELATED APPLICATIONS

The application claims priority to U.S. Provisional Application 63/008,027, filed Apr. 10, 2020, the contents of which are incorporated herein in their entirety.

FIELD OF THE INVENTION

The invention relates generally to a system and method for implementing an application prediction engine for predictive caching based on user behavior.

BACKGROUND OF THE INVENTION

In existing environments, with large sets of data, users often query historical data to create reports on a regular basis. The reports may involve multiple iterative queries on large data sets from various sources of data. These data intensive queries can take a long time to run and slows down the reporting generation and analysis process. This delay deteriorates user experience, degrades business performance and creates inefficiencies.

These and other drawbacks exist.

SUMMARY OF THE INVENTION

According to one embodiment, the invention relates to a system that provides predictive caching based on user behavior. The system comprises: a data collection processor that captures usage data and session data from a user via a client interface executing an application; a prediction data storage that stores the usage data and session data; and a prediction engine that provides predictive caching for the user, the prediction engine comprising a computer processor, coupled to the data collection processor and the prediction data storage and further programmed to perform the steps of: based at least in part on the captured usage data and session data, generating a transition probability matrix applying a forecasting request load model to data sequences associated with the user that identifies prediction data; creating a schedule, based on the transition probability matrix, that identifies when the predicted data will be required by the user; applying, via a task scheduler, the schedule to execute one or more tasks to cache data from an application database based on the schedule; and retrieving, via a cache processor, data based on the schedule, wherein the cache processor communicates with the user via a service layer associated with the application that executes a query service and a cache service based on a user request.

According to another embodiment, the invention relates to a method that provides predictive caching based on user behavior. The method comprises the steps of: capturing, via a data collection processor, usage data and session data from a user via a client interface executing an application; storing, via a prediction data storage, the usage data and session data; based at least in part on the captured usage data and session data, generating, via a prediction engine, a transition probability matrix applying a forecasting request load model to data sequences associated with the user that identifies prediction data; creating a schedule, based on the transition probability matrix, that identifies when the predicted data will be required by the user; applying, via a task scheduler, the schedule to execute one or more tasks to cache data from an application database based on the schedule; and retrieving, via a cache processor, data based on the schedule, wherein the cache processor communicates with the user via a service layer associated with the application that executes a query service and a cache service based on a user request.

An embodiment of the present invention is directed to a specially programmed computer system comprising one or more computer processors, interactive interfaces, electronic storage devices, and communication networks. The computer implemented system and method described herein provide unique advantages to analysts and other users of data sets, according to various embodiments of the invention. An embodiment of the present invention is directed to implementing an application prediction engine that realizes efficient use of resources, faster processing time, timely results, etc. The application prediction engine builds a cache for a large queried data set to improve user experience. For example, benefits may include the ability to track user activity and capture usage for a specific feature which may be used for caching data that is frequently looked at. Other benefits may include the ability to predict user behavior for new features and help retire features that are not used. In addition, the innovative system may monitor peak usage of applications and make them more scalable and accessible at peak times.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

DETAILED DESCRIPTION OF THE PREFERRED EMBODIMENT(S)

Figure 1:
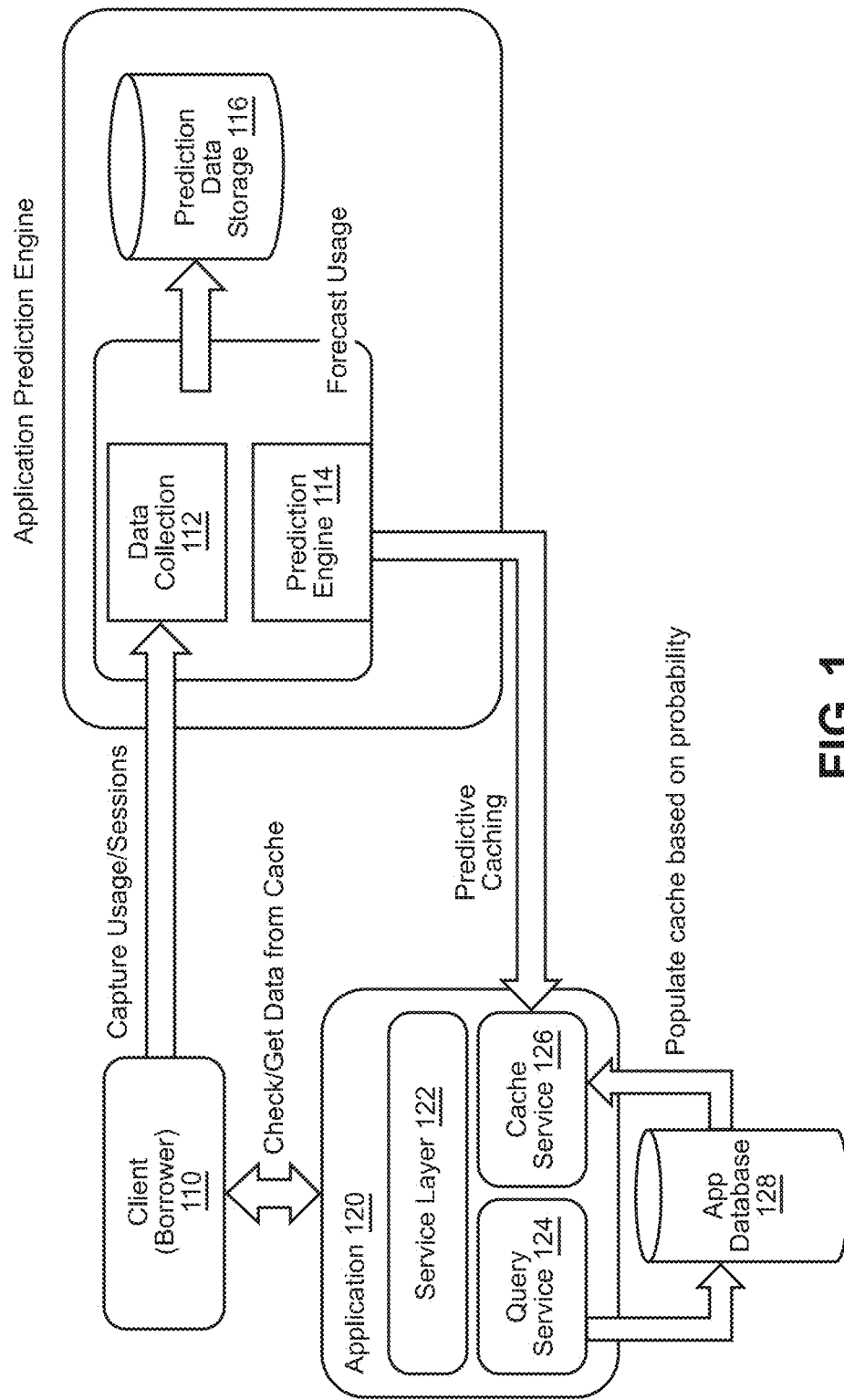
FIG. 1 is an exemplary system diagram of an application prediction engine, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to improving user experience by predicting what kind of data extracts and/or reports users will run based on "data crawl" and date/time patterns of historical extracts and other behavior. For example, in a particular business unit (e.g., Asset and Wealth Management (AWM) Finance), an embodiment of the present invention recognizes that users run specific types of extracts and reports on a given business day for a month end close. Because many of these datasets are parametrized, any effort to generate canned reports would be endless and unduly burdensome.

An embodiment of the present invention is directed to incorporating advanced analytics and machine learning features to support an innovative prediction engine for queries, reports and other data requests with predictable patterns.

An embodiment of the present invention is directed to dynamic caches that handle a large request load using limited resources. An embodiment of the present invention is directed to exploring forecasting request loads to provide an optimal cache based on historical data. For example, the prediction engine may first forecast the most likely requests for a next day time frame (or other time period). Then, the timing of those requests may be forecasted. Optimization may be performed on the forecasted request load to provide an appropriate cache based on user priority, content size of the payload as well as other factors and considerations. An embodiment of the present invention is directed to using predictability and building a cache that would be ready to serve query requests and improve user experience.

An embodiment of the present invention is directed to extracting a repeatable pattern and predictability in a user's behaviors. This information is then used to pre-warm a cache. This allows a cache to efficiently serve results of a query that a user is predicted to perform based on a probability determination or calculation. The probability is based on collected behavior data from the user or data that represents a user. An embodiment of the present invention is directed to collecting user behavior data (or other data relating to a user's behavior), calculating probability and then building the cache. For example, when behavior data for a specific user is unavailable or incomplete, an embodiment of the present invention may apply user profile data to determine prediction data. Profile data may include data relating to similar users based on various factors including location, application, line of business, business profile, etc. Profile data may represent a compilation of a group of users or representative users with similar characteristics. For example, profile data may apply behavior data for a user working in North America and performing analysis relating to an Equities Asset Class. Other variations and extensions of profiles may be applied.

FIG. 1 is an exemplary system diagram of an application prediction engine, according to an embodiment of the present invention. An embodiment of the present invention is directed to tracking, storing, analyzing and forecasting future user interaction on one or more applications. An embodiment of the present invention may be implemented via a processor, server, and other on-premises environment, cloud services and/or other system architectures and implementations.

With an embodiment of the present invention, a user may interact with an application. This may involve logging in and executing queries. A database may record the user actions, interactions and/or other behavior data. Based on the data collection, an embodiment of the present invention may calculate probability, e.g., transition probability. Based on the probability calculation, queries may be executed from the backend. This may then be used to build a dynamic cache to better respond to and serve the predicted user requests and other actions.

An embodiment of the present invention may be applicable to query intensive applications, such as historical data splicing, etc. For example, a user may execute a query and receive results. Based on the results, the user may perform a second query and continue with additional queries. These additional queries may be performed in an iterative manner. An embodiment of the present invention achieves shortened response time which improves user experience. Generally, a cache may represent a system's fast memory and may be considered limited in various applications and uses.

FIG. 1 illustrates an Application Prediction Engine that predicts user requests to prepare a cache ahead of time, allowing users to retrieve data quickly. As shown in FIG. 1, the Application Prediction Engine comprises multiple stages including: Data Collection/Usage Statistics; Probability Calculation and Cache Population. Data Collection/Usage Statistics refer to collecting user behavior data including day/time, how frequently they log in, how long their sessions last, what queries they execute, etc. Probability Calculation relates to calculating the probability of the next actions based on the collected user behavior. Cache Population refers to using the probabilities calculated and the predictions of their subsequent behavior as the foundation to populate the cache. In addition, cache eviction may be performed based on several factors such as available memory, number of users with higher probability of their actions etc.

As shown in FIG. 1, a user may interact with a client device having a browser or other user interface, represented by 110. The user may log in and perform queries and other actions. Data Collection 112 may capture usage, sessions and/or other user interaction data. Data may be stored and managed at Prediction Data Storage 116. For example, Prediction Data Storage 116 may manage and store prediction data and may include namespace specific application user behavior data.

Representative usage data may include key measurements such as click history (e.g., frequency, session duration, features used, features not used, etc.), click path history (e.g., navigation based on time of day, day of week or other time period, etc.) and other historical behavior data. Key stored derived statistics may include a transition probability matrix as well as multiple probability matrices. An embodiment of the present invention is directed to a prediction engine that supports applications to leverage a smart cache for next predicted steps of a user's actions.

An embodiment of the present invention may include a dashboard or user interface that supports data analytics and other views relating to data stored and managed. For example, a dashboard may provide visualization of usage by date, date range or other time period (e.g., log in by date data, etc.), features used by user (e.g., number of features used by each user or group of users, etc.), and/or other factors.

Prediction Engine 114 may forecast usage and provide predictive caching to an Application 120. For example, Prediction Engine 114 provides APIs to populate Cache Service 126 to retrieve probability of next user action. Application 120 may include Service Layer 122 that interacts with Client 110 to support check and get data actions with the cache. Application 120 may also include services such has Query Service 124 and Cache Service 126. Query Service may submit queries to App Database. App Database 128 may populate the cache based on probability.

An embodiment of the present invention is directed to warming a dynamic cache by predicting user actions. When the user logs in, in addition to capturing the user's current session, an embodiment of the present invention may serve requests from a cache based on probability prediction determinations. Accordingly, predicted data may be served from the cache. And for data that was not predicted, data may be served through a query service. Through improved prediction data, an embodiment of the present invention may seek to serve more requests through Cache Service 126 with Query Service 124 as a secondary layer of service.

An embodiment of the present invention may receive user interaction data in real-time and perform prediction determinations continuously thereby pre-loading the cache as the user interacts with an application or system. In addition, artificial intelligence and machine learning libraries may be implemented and used to improve cache population and user predictability.

Figure 2:
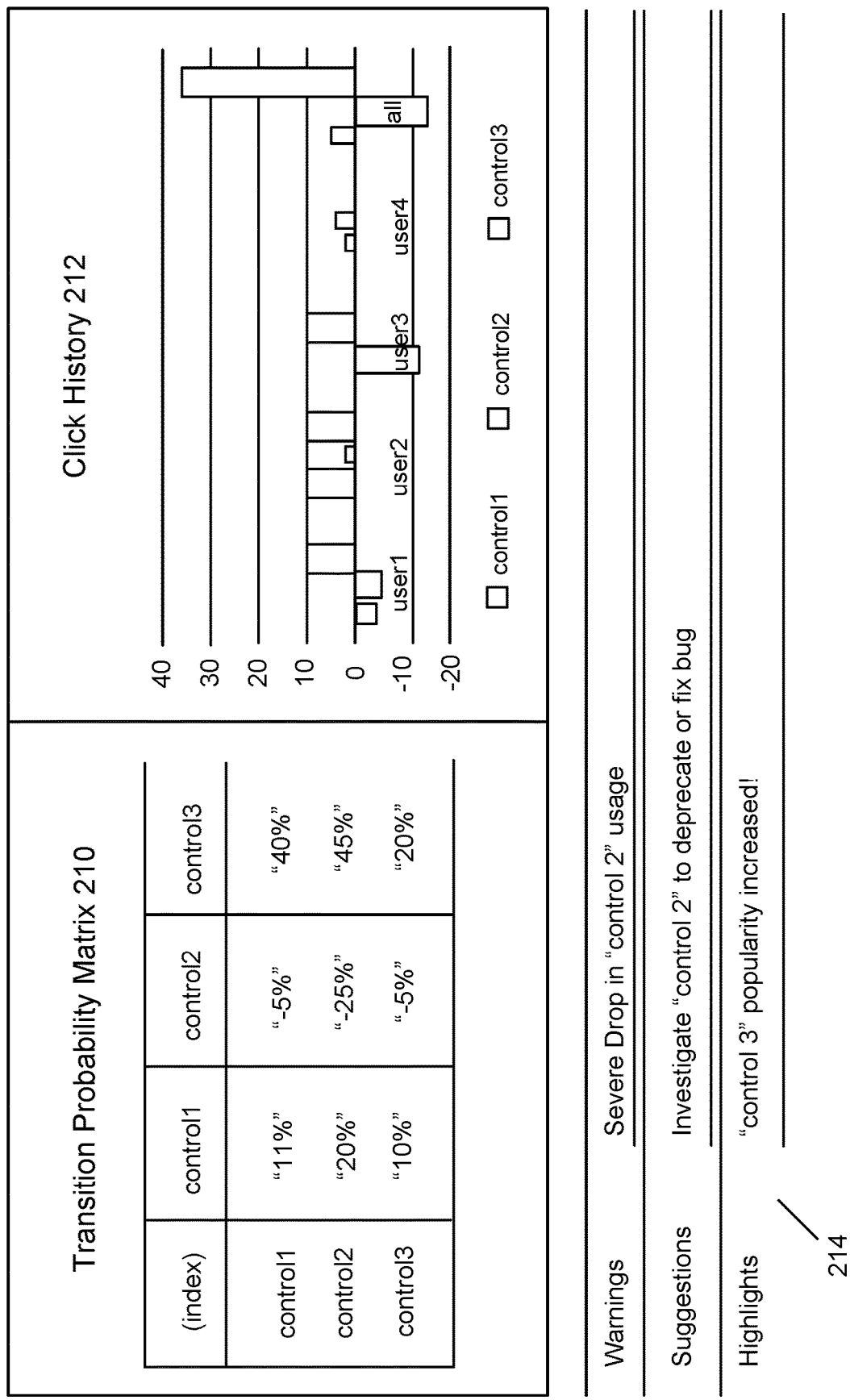
FIG. 2 is an exemplary interactive user interface, according to an embodiment of the present invention.

FIG. 2 is an exemplary interactive user interface, according to an embodiment of the present invention. FIG. 2 illustrates a usage history dashboard. As shown in FIG. 2, 210 may represent transition probability matrix and 212 may represent click history. 214 may provide warnings, suggestions, highlights, etc. Other metrics and observations may be provided.

Figure 3:
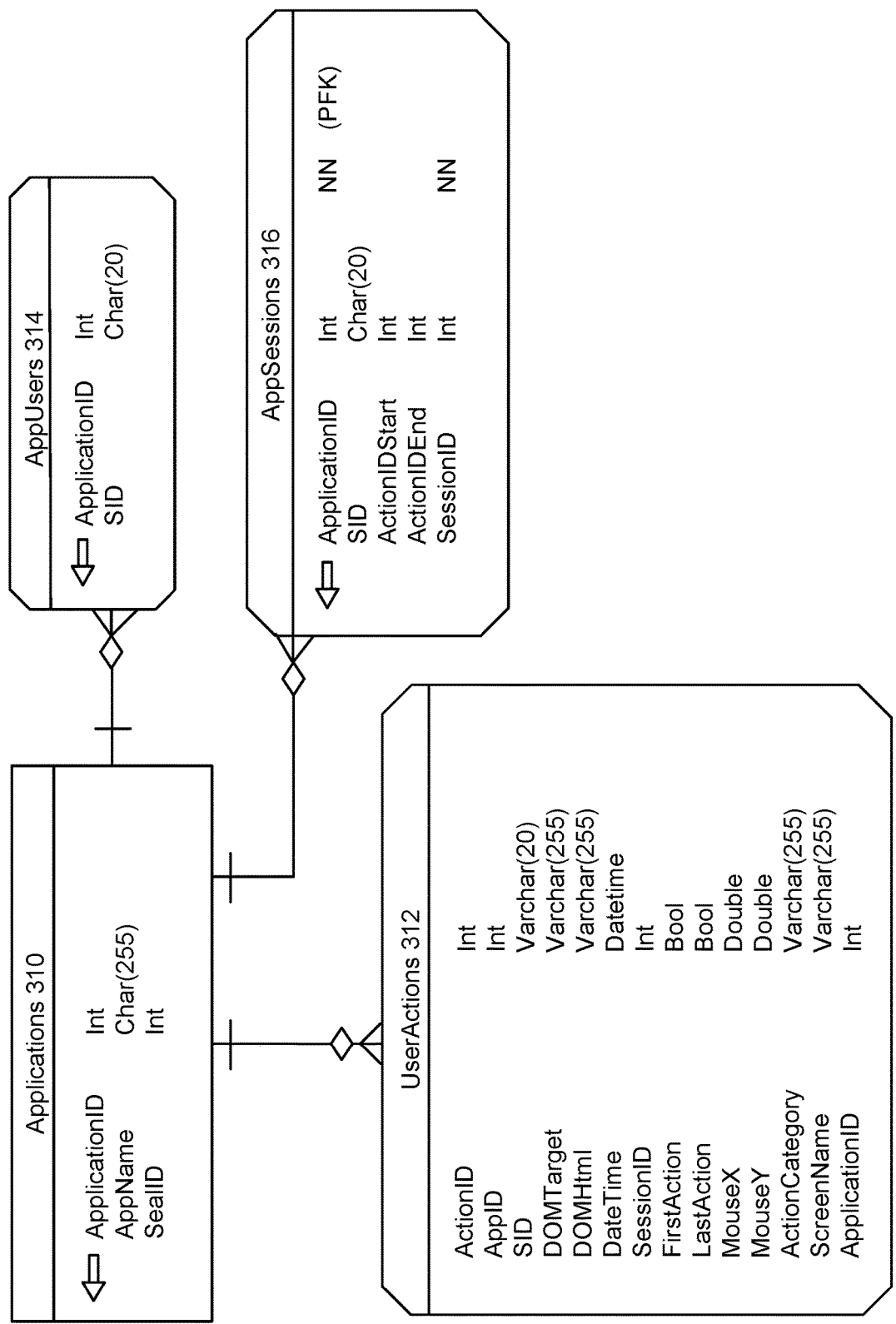
FIG. 3 is an exemplary data schema, according to an embodiment of the present invention.

FIG. 3 is an exemplary data schema, according to an embodiment of the present invention. The schema of FIG. 3 includes Applications 310, User Actions 312, App Users 314 and App Sessions 316. FIG. 3 is merely exemplary and other schema and variations may be implemented in accordance with the various embodiments of the present invention.

Figure 4:
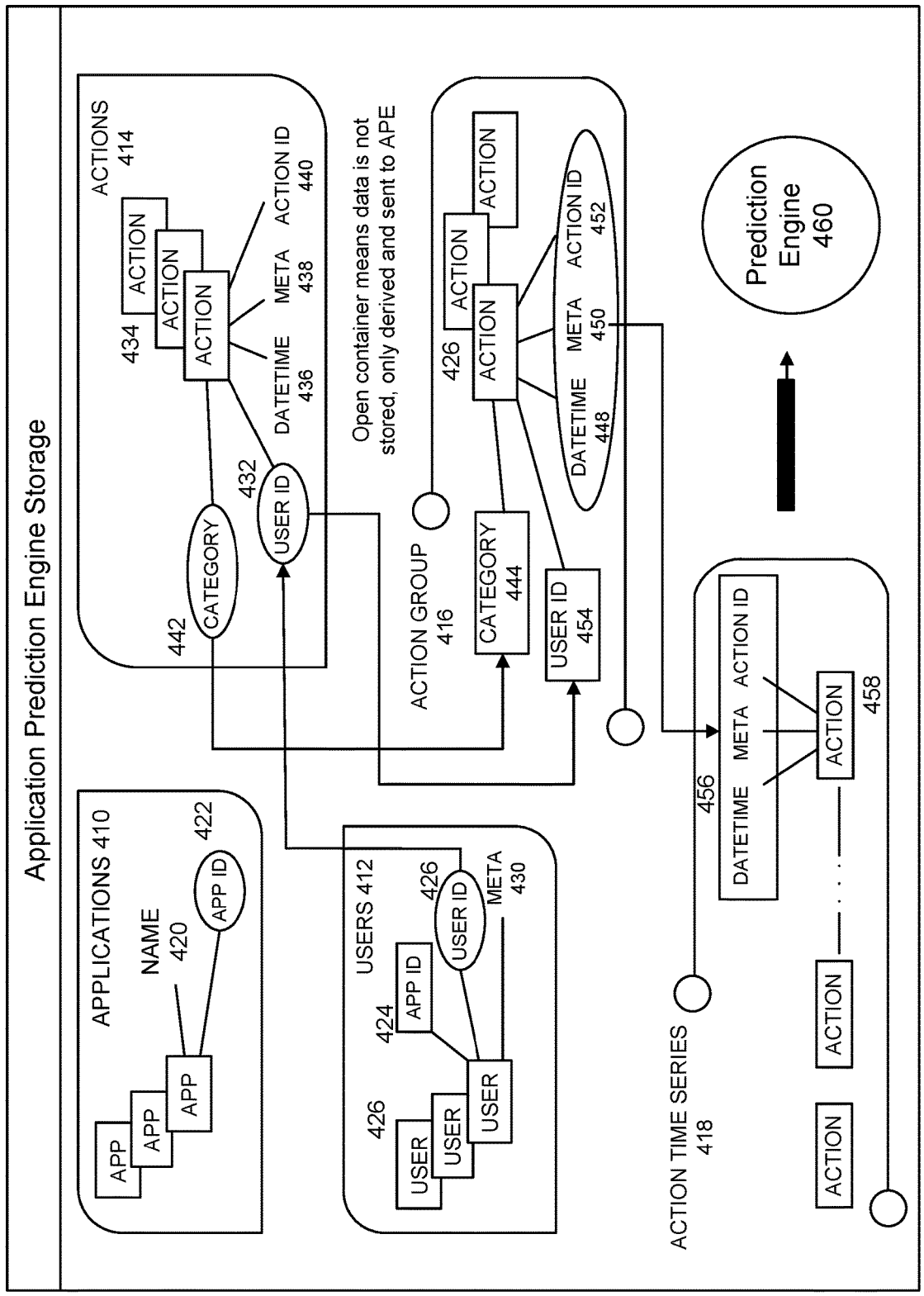
FIG. 4 is an exemplary data model, according to an embodiment of the present invention.

FIG. 4 is an exemplary data model, according to an embodiment of the present invention. FIG. 4 represents an exemplary high level storage model that may be used for a prediction engine. FIG. 4 illustrates Applications 410, Users 412 and Actions 414. Applications may include Applications 420 and Application Identifier 422. Application Identifier 422 may be the same or related to Application Identifier 424. Application Identifier 424 may be associated with Users 426. Each User represented by 426 may be associated with User Identifier 428. Meta data 430 may be associated with Users 426. User Identifier 428 may be the same or related to User Identifier 432. User Identifier 432 may be associated with Actions 434. Each Action 434 may be associated with Date/Time 436, Meta data 438 and Action Identifier 440. Actions may be identified by category 442.

Under Action Group 416, Category 442 may be the same or related to Category 444. Category 444 may be associated Actions 446. Actions 446 may include Date/Time 448, Meta data 450 and Action Identifier 452.

Under Action Time Series 418, Meta data 450 may be the same or related to data associated with 456 and Action 458. The data may then be sent to Prediction Engine 460.

As shown in FIG. 4, users may indicate some action that are then categorized with date/time and an action ID. That information is then used to perform a prediction determination or probability calculation. Based on the probability, a top set of probabilities may be applied to the caching engine.

Figure 5:
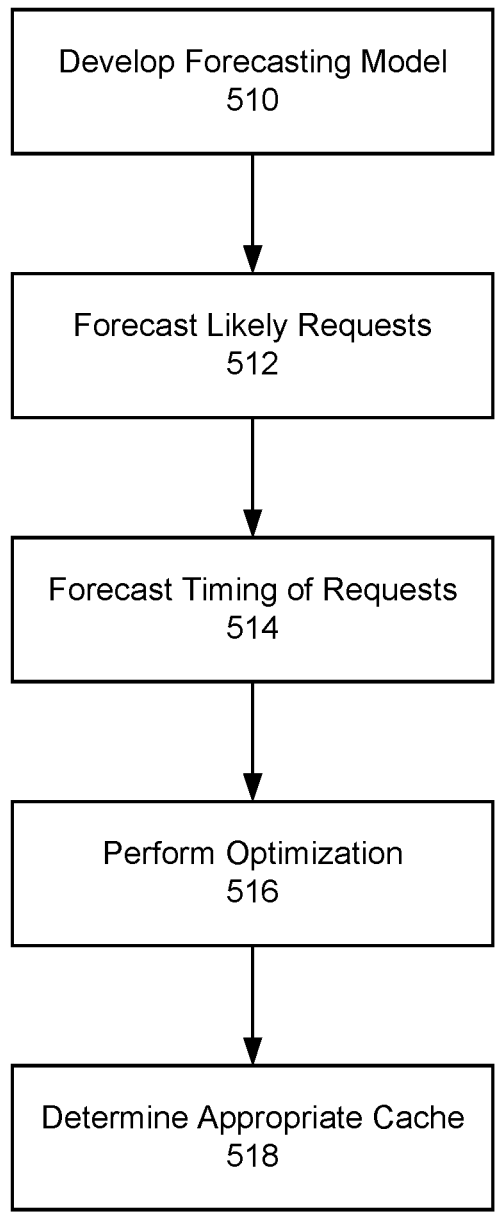
FIG. 5 is an exemplary flow diagram, according to an embodiment of the present invention.

FIG. 5 is an exemplary flow diagram, according to an embodiment of the present invention. At step 510, a forecasting request load model may be developed. Step 512 may then forecast a set of likely requests. Step 514 may forecast timing of requests. At step 516, optimization may be applied. At step 518, an appropriate cache may be determined and applied. This may be based on user priority, payload and/or other factors. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

An embodiment of the present invention is directed to predicting sequences based on sequence history. User Actions may involve recording situations or states. For example, an exemplary sequence history may include eight states, e.g., four regions, two clients and two asset classes. In this example, a user may use only seven of these options before initiating a search. An embodiment of the present invention may identify the sequences the user navigated between these options in the form of a matrix. Each matrix entry may represent the number of times that an action (in a column) was preceded by another action (in a row).

In addition, another set of actions associated with the user may be recorded. This set of actions may yield another sequence matrix. Using these two action matrices, an embodiment of the present invention may infer how the user is likely to act in the future. Adding the two action matrices provides a count of how many times the user navigates from one option on the screen to another (or the same one). An embodiment of the present invention may then divide each row by its sum to generate a transition probability.

An embodiment of the present invention may collect and aggregate action sequences continued over a time period to obtain a more refined transition matrix. With an approximation of the user's behavior, an embodiment of the present invention may predict the user's future actions. A most likely path based off the transition matrix that has been calculated may be identified.

Based the forecast, a set of queries may be identified. By observing the history of data requests the user has performed, an embodiment of the present invention may identify an outlier or anomaly (e.g., the user does not query such generic data for X). Therefore, an embodiment of the present invention may omit "X" from the forecast and cache data for the second predicted request.

An embodiment of the present invention may add a time dimension to actions and group accordingly. A transition matrix used for each step at a time may be used to calculate a most likely sequence (or set of sequences) at that time. Accordingly, an embodiment of the present invention may consider previous actions the user has taken as well as the transition between the first actions in the sequence. An embodiment of the present invention may consider another transition matrix to capture how the user decides to start the user's next action sequence.

The first sequence may indicate the user's preference of starting actions. The second action set may yield another preference. Accordingly, an embodiment of the present invention may create an additional transition matrix for the starting actions.

According to an exemplary illustration, the matrix may indicate that if the user starts a query for data in Region 1, the user is equally likely to make a second query concerning either the Region 1 or Region 2, or Class A. The first matrix for the user's actions may be represented as cyclical. The last action in a sequence may be the same, such as a Search button that initiates a query. Essentially, the last row of that matrix may lead to inappropriate (infinitely looping) sequences because the user's next search does not only depend on his last action, it may depend on multiple actions before the Search was selected. By tracking the first action of a sequence, an embodiment of the present invention may refer back to a minor transition matrix to start the next sequence. Also, the minor transition matrix may be referred to start a new sequence.

An embodiment of the present invention may refine the algorithm throughout the prediction process. For example, to identify a unique path of least resistance, an embodiment of the present invention may measure each possible path and score the path by their likelihood. Accordingly, an embodiment of the present invention may be used to identify a most likely approximation of the users path in the future for a number of iterations of time, with a confidence level equal to that of the total probability along the path. A smart cache may be implemented when working with limited resources and users who may have higher priority for the data they need to see. The priority weighting technique offers utility for users that are not available with current systems.

According to an embodiment of the present invention, an Application Prediction Engine may be designed to calculate probability of future user actions and cache data based on that probability. For example, if a user logs in at 9:00 A.M. every day and executes the same requests in the same order, the engine will calculate a probability of that sequence of requests at 100%.

An embodiment of the present invention is directed to calculating based on probability of transition from one request to the other. An embodiment of the present invention recognizes the importance of distinguishing between "Standalone or Frequentist Probability" and "Transition Probability."

With Standalone or Frequentist Probability, if all actions were considered as independent events, this probability would be based on the number of times a specific action is executed from all the actions the user has executed so far (and not all possible choices in the system).

Transition Probability may be calculated based on previous transitions. Calculating this probability considers the immediate previous action taken. When large numbers of transitions have happened, this starts to converge with standalone probability. An embodiment of the present invention is directed to implementing a transition probability that applies prediction analysis to sequences as opposed to independent standalone actions. For an exemplary sequence of ABDC, an embodiment of the present invention addresses sequences in pairs, which would involve a sequence of A to B, a sequence of B to C and a sequence of C to D.

For example, if a user executes Requests A, B and C respectively all the time, the probability will be 100%. If the sequence is different, the application prediction engine may create a transition matrix and use it to calculate the probability for these transitions.

An embodiment of the present invention recognizes that predictive models behave and converge towards actual behavior after collecting a very large set of sample sizes. In an initial phase of the prediction, it would result into naively optimistic values (such as 100% based on two consecutive same actions).

According to an embodiment of the present invention, probability may be defined as the number of times an event occurs divided by the total number of events that can (or have occurred). In the context of a model, probability may be further defined as the number of times a request B was made after another request A divided by the total number of request that have occurred after A.

The frequentist way to measure the request probability may be based on the number of times an action has occurred (e.g., a request has been made) over the number of total requests that have been made. In this case, the transition history is ignored so some information may be lost about how the requests are related to each other. There are some potential roadblocks with this approach.

According to an exemplary illustration, a set of user actions may be represented as: {A, B, C, A, B, C, A, B, C}. In this example, there are a total of 9 actions and three unique requests represented by A, B, and C. They each occur three times, giving each a probability of $3/9=1/3\sim33\%$ chance of occurring using this model. This would likely lead to a predicted path with very low probabilities (e.g., {A, B, C}=$33^3\%=\sim3\%$). This may be compared to the transition model, where the path predicted has 100% certainty given the last observation.

By measuring a transition probability, a distance between each request may be manufactured. It is akin to at point A, knowing how far away B and C are, so the closest one may be selected. Transition probabilities may represent local frequentist probabilities which describe the frequentist probability with respect to a preceding request. Accordingly, an embodiment of the present invention recognizes that transition probability yield better forecasts.

An embodiment of the present invention seeks to address outliers by leveraging average usage patterns to predict a user's next actions. Taking the example above, a usage pattern may be presented by {A, B, C, A, B, C, A, B, C, D}. Given the context of an average usage approach, this outlier should be abstracted away. In this example, A, B and C all have the highest frequentist probability so they may be used as starting points for generating paths. The only way to find D is starting from C, but A is more likely to occur. This path may loop back to C and be closed, D never occurring in the prediction. This is the desired effect because D is assumed to be not a part of their regular usage pattern (it is an outlier).

An embodiment of the present invention is directed to sub-patterns. Patterns within patterns may present obstacles to determining a useful prediction. An exemplary illustration may involve pattern {A, B, A, C, A}. With this pattern, one would not know where to go from A based off the last observation. In fact, one would need the last two observations to find the right pattern 100% of the time. The number of observations needed to find a good pattern depends on how nested the sub pattern is. By considering multiple starting points of path, this problem may be mitigated.

To address this, an embodiment of the present invention may generate each path that can occur out of the most probable ones and cache all the requests that are included in those paths. This exemplary embodiment may lead to over-caching in some scenarios/situations, but may be necessary to consider the most likely requests the user would make based off their usage history.

An embodiment of the present invention is optimal for applications with windows of time where users are not active and predictions may be generated for future use. With an embodiment of the present invention, transition matrices may be stored in a way that they may be updated modularly without much additional computation.

Data Collection may involve collecting data on usage. For an application, collected data may include application identifier, project name, user identifier, session information, request parameters (e.g., query parameters). For web applications, a JavaScript class may be added to the project and configured to start sending user requests to the application prediction engine server for storage.

An embodiment of the present invention may implement a prediction algorithm. Inputs may include a series of request that were recorded and timestamps. This may represent a user request history. Outputs may include predictions of next requests and the probability that they will occur at a certain time in the future.

An embodiment of the present invention may be implemented in various ways. For example, an embodiment of the present invention recognizes that transition probabilities may represent a type of conditional probability. According to an exemplary illustration, the following definitions of probability may be applied:

$$P(A \mid B) = \frac{P(A \cap B)}{P(B)}$$

$$P(A \mid B) - P(A) = \frac{P(A \cap B)}{P(B)} - P(A)$$

For $P(A|B) > P(A)$, the following may apply:

$$P(A \cap B) > P(A)P(B)$$

Using the formula for the correlation coefficient:

$$\rho_{A,B} = \frac{E(1_A 1_B) - E(1_A)E(1_B)}{\sqrt{\sigma^2(1_A)\sigma^2(1_B)}} = \frac{P(A \cap B) - P(A)P(B)}{\sqrt{P(A)(1 - P(A))P(B)(1 - P(B))}}$$

where $1_S$ is an indicator variable for if event S occurred and $E(x)$ is an expectation (average) operator. For the path probability to hold, there are positive correlation coefficients from state to state. This may ensure that the transition probability is higher than the unconditional probability.

A set of strong assumptions may be implemented including: users frequently use a website to ensure the probabilities converge close to their true values; and users act consistently across sessions to ensure the correlation coefficient is positive across transitions.

A set of weak assumptions may be recognized, including: requests may have predictable components (e.g., nonrandom, static attributes, etc.). This may represent challenges with respect to encoding the variables that generate the transition matrix. However, additional configuration may be applied to massage these attributes, referred to as flow variables.

Another weak assumption may include: user request cycles are short and there are not many of them. A series of requests that repeats is made up of request cycles. There is a preference that these are short to make it easier to predict the user's next request. Additionally, an embodiment of the present invention may prefer that there are not many request cycles that the user follows. This problem may be mitigated by using binning criteria, as discussed below.

An embodiment of the present invention may apply a preprocessing stage. Each request may be encoded to a unique value by combining attributes specified by the user, or by default the hostname, URL parameters, and request body (e.g., "hostname|params|body"). Optionally, the body may be processed to adjust attributes using a ruleset passed to the program. Each new ID may be assigned a number as it is encoding. The request history may then be encoded using the ID encodings and the respective timestamps may be placed in a separate array. A probability transition matrix may be formed from the encoded ID series (e.g., Markov matrix). This results in a series of IDs, the respective times at which they occurred and the derived state transition probability.

An embodiment of the present invention is directed to generation of all possible paths the user can take, followed by choosing the most likely path at each step. As shown below, this may be implemented in a computationally reasonable manner. The formulas for the probabilities as well as the path generation that determines the forecast are described below.

Consider a user having N historical data points:

$$\begin{cases} H = \{r_0, r_1, \ldots, r_n\} = \{r_i\}_{i=0}^n \\ r_i = \text{metadata about a request tagged with a utc timestamp} \\ \text{timestamp}(r_i) < \text{timestamp}(r_{i+1}) \end{cases}$$

Using the metadata associated with each request, H is transformed into a series of encoding, as shown below:

$$enc(H) = \{e_0, e_1, \ldots e_T\} = \{e_i\}_{i=0}^T$$

where e can be one of any of the encodings made from H. Denote these N unique encoding as the set $E = \{e^i\}_{i=1}^n$ which may be considered the universe for calculations.

$$I_e = \{b_i\} : \begin{cases} b_i = 1 & \text{if } b_i = e \\ b_i = 0 & \text{else} \end{cases}, 0 \le i \le n$$

$$I_e \cdot I_s = \{b_i\} : \begin{cases} b_i = 1 & \text{if } b_{i-1} = e, b_i = s \\ b_i = 0 & \text{else} \end{cases}, 0 \le i \le n$$

$$P(e) = \frac{\sum I_e}{T}$$

$$P(e_i \cap e_s) = \frac{\sum I_{e_i} \cdot I_{e_s}}{\sum_j I_{e_i} \cdot I_{e_j}}$$

$P(e)$ would be the frequentist probability and $P(e_i \cap e_s)$ would be the transition probability. These binary vectors allow algorithms to be defined more precisely. The above definitions may be generalized by binning observations in E according to some criteria (e.g. those that occur on the same weekday, business day, etc.). The definitions may adjust in notation to reflect which bin they fell into. This may be implemented in a design of an embodiment of the present invention. In practice, after the observations are binned, they are binned again, now by intraday time intervals and date. From these sub bins, transition matrices are derived and later aggregated by date to approximate user behavior at a specific time interval of the day.

The definitions above provide a transition probability matrix:

$$\beta = \begin{pmatrix} P(e_0 \cap e_1) & \cdots & P(e_0 \cap e_n) \\ \vdots & \ddots & \vdots \\ P(e_n \cap e_0) & \cdots & P(e_n \cap e_n) \end{pmatrix}$$

When referring to $\beta(e_i)$, the row is referenced wherein the transition probabilities $P(e_i \cap e_j)\}_1$ are found. $\beta_j(e_i)$ is the $j^{th}$ entry of $\beta(e_i)$ or $P(e_i \cap e_j)$.

The user's next request may be considered to be a random variable X. Using the above, the formula for the next request may be represented as:

$$e_{n+1} = X(t+1) = f(X(t)) + \epsilon \sim \beta(e_n)$$

$$X(0) = X_0 = \max(P(e)) : e \in E$$

$$f(X) = \underset{j}{\mathrm{argmax}}\, \beta_j(X)$$

Note that there may be more than one $X_0$ that satisfies the above definition. In that case, all $X_0$ that are accepted will generate a path. The conditional probability of a path at any point is defined by:

$$P(X_t \cap X_{t-1} \cap \ldots \cap X_0) = \Pi_{i=1}{}^t P(X_i \cap X_{i-1})$$

Alternatively, it may be recursively defined as:

$$P(X_t) = P(X_t) * P(X_{t-1})$$

Using the frequentist probabilities as a starting point and the transition matrix as a "road map" of sorts, an embodiment of the present invention may forecast out $\tau$ steps. The encodings $\{e_T, \ldots, e_\tau\}$ are then remapped to the appropriate request metadata, with hydration and eviction times injected from the sub bin they are associated with. This is given to a cache (with a probability of occurrence) to be stored. This forecasted request series may be defined as:

$$r^f(\tau) = \{r_{T+1}{}^f, r_{T+2}{}^f, \ldots r_{T+\tau}{}^f\}$$

This $r^f(\tau)$ may represent the set of all unique forecasts the algorithm has predicted (excluding duplicates across paths from multiple starting points $X_0$).

Depending on the amount of data available, the intraday bins (time intervals) may be shortened to capture behavior on a finer level. This would provide a higher degree of accuracy to the forecasts if the user consistently accesses data at the same time of the day. In contrast, when we don't have a lot of data it is preferred to keep the intervals large. So, by relaxing the interval between which we bin our requests, we allow more randomness to the users.

With other probability considerations, there may be a state that has no transition history. In this case, an embodiment of the present invention may opt to restart the path from a most likely frequentist probability or simply end the forecast at that point. To avoid attributing high probability to inactive users, the forecast probabilities may be scaled down proportional to the amount of time that has passed since their last recorded request.

Figure 6:
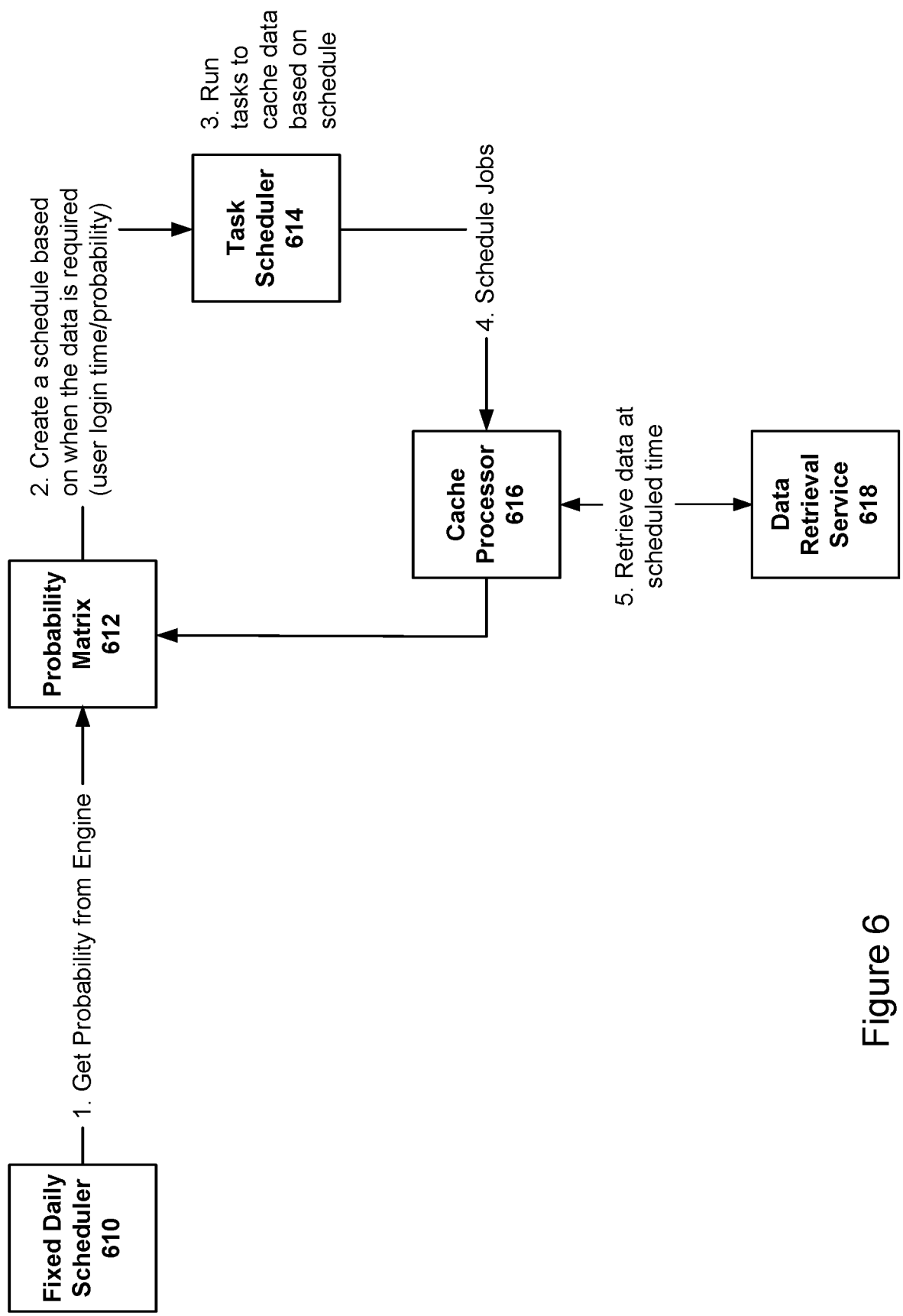
FIG. 6 is an exemplary flow diagram, according to an embodiment of the present invention.

FIG. 6 is an exemplary flowchart illustrating smart caching, according to an embodiment of the present invention. According to an embodiment of the present invention, smart caching may represent caching the data based on prediction information received from an Application Prediction Engine. For example, data may be initially cached for 1-hour time frame for all queries, based on memory usage data may be evicted comparing two exemplary conditions LRU (Least Recently Used) and data having less probability.

As shown in FIG. 6, Fixed Daily Scheduler 610 may retrieve probability from an Application Prediction Engine. Probability Matrix 612 may be used to create a schedule based on when the data is required (e.g., user login time, probability, etc.). Task Scheduler 614 may run tasks to cache data based on the schedule. Task Scheduler 614 may then schedule jobs. Cache Processor 616 may retrieve data at scheduled times from Data Retrieval Service 618.

Based on probability and user session, a first cache eviction may be based on a time period, e.g., a 1 hour time frame. Other time frames may be implemented. In this example, after the time period, e.g., 1 hour, data may be evicted. If multiple queries are to be cached at the same time, preference may be based on probability. If a similar query is executed by another user, data may be served from cache.

A Scheduler may run daily at a predetermined time to fetch probability information. In addition, the cache may be refreshed at frequent intervals based on usage and probability. Forecast requests may be sorted based on a probability percentage where higher probability requests may be given more preference. Once a higher probability is cached and there is a space to accommodate, then lower probability requests may be cached. Data may be held in the cache based on a cache eviction policy (e.g., time, LRU, etc.).

An example illustrated here involves two users having the following forecasts from the application prediction engine of an embodiment of the present invention.

In this example, API may send the following data:

| User | Probability | Date and time | request |
| --- | --- | --- | --- |
| USER_1 | 55 | 2021 Jan. 20 08:30:40 | QUERY1 |
|  | 100 | 2021 Jan. 20 09:00:57 | QUERY2 |
| USER_2 | 80 | 2021 Jan. 20 09:30:00 | QUERY3 |
|  | 70 | 2021 Jan. 20 10:00:57 | QUERY1 |

As shown here, users frequently use the website and users act consistently across the sessions.

An embodiment of the present invention may perform a sort and schedule process shown below:

| | |
| --- | --- |
| QUERY2 | 9.00AM |
| QUERY3 | 9.30AM |
| QUERY1 | 8.30AM |
| QUERY1 | 10.00AM |

In this example, four jobs are scheduled to fetch the data where preference is given to a higher probability request QUERY2. Here, an assumption is applied that there is no space to accommodate QUERY2 at 9.00 AM previously cached and QUERY1 will be evicted.

An embodiment of the present invention may specify the cache. For example, expiry may be set to 1 hour and an eviction policy may be based on time and least recently used (LRU). This example may assume cache memory is full after caching data for QUERY1, QUERY2, and QUERY3. In this scenario, an embodiment of the present invention may cache the same data for QUERY1 which is already cached so the time to live for this object is increased instead of caching the data again.

According to an exemplary illustration of an Application Prediction Engine, a user may interact with a monitored web app. The user makes requests (A, B, C, and F) over a series of days and may be recorded. An embodiment of the present invention may consider a subset of the days depending on a predetermined criteria. For example, the requests made on the same weekday as today, or perhaps the same business day as today last month may be considered. The larger the increment, the more data may be needed to get a good approximation of user behavior. This approach may be scaled up or down to multiple bins or only one (which may consider all observations in the same bin). This may be referred to as binning criteria. For example, an embodiment of the present invention may choose a binning criteria that yields four bins with observations. Table 1 below illustrates a simple user request history:

| DAY | REQ1 | REQ2 | REQ3 | REQ4 |
|---|---|---|---|---|
| 1 | A | B | C | D |
| 2 | F | B | C | D |
| 3 | A | F | E | E |
| 4 | A | B | C | D |

In this example, all bins may be assumed to occur on the same time interval. User actions may be interpreted to make predictions and then observed to see how close the predictions are to an expected result.

This request history may help generate the probability of the next request and the next time at which it will occur. From the above, the following request transition probabilities and frequentist probability may be obtained. Table 2 below illustrates a request transition probability matrix.

| request Previous request | Next | | | | | |
|---|---|---|---|---|---|---|
| | A | B | C | D | E | F |
| A | | $\frac{2}{3} \sim 66\%$ | | | | $\frac{1}{3} \sim 33\%$ |
| B | | | $\frac{3}{3} = 100\%$ | | | |
| C | | | | $\frac{3}{3} = 100\%$ | | |
| D | | | | | | |
| E | | | | | $\frac{1}{1} = 100\%$ | |
| F | | $\frac{1}{2} = 50\%$ | | | $\frac{1}{2} = 50\%$ | |

| | A | B | C | D | E | F |
|---|---|---|---|---|---|---|
| Frequentist Probability | $\frac{3}{16} = 18.75\%$ | $\frac{3}{16} = 18.75\%$ | $\frac{3}{16} = 18.75\%$ | $\frac{3}{16} = 18.75\%$ | $\frac{2}{16} = 12.5\%$ | $\frac{2}{16} = 12.5\%$ |

The frequentist probabilities yield four starting points: A, B, C and D. Using Table 1: Request Transition Probability Matrix, the following paths may be generated.
Forecasted Paths from A:
 Path 1: ABCD

| time | Relative | | |
|---|---|---|---|
| Metadata | t1 | t2 | t3 |
| Next Request | B | C | D |
| Spot Probability | 66% | 100% | 100% |
| Path Probability | 18.75% * 66% = 12.37% → | 12.37% * 100% = 12.37% → | 12.37% * 100% = 12.37% |

Forecasted Paths from B:
 Path 1: BCD

| time | Relative | | |
|---|---|---|---|
| Metadata | t1 | t2 | t3 |
| Next Request | C | D | |
| Spot Probability | 100% | 100% | |
| Path Probability | 18.75% * 100% = 18.75% → | 50% * 100% = 50% | |

Spot probability represents the probability at one point in a path. Path probability represents the probability of the entire path, otherwise known as conditional spot probability.

Similarly, a path from C will result in a path {C,D}~18.75% and a path from D will be just a single point D~18.75%. The paths with the highest probability (18.75%) are the ones starting from B, C, and D. This means that an embodiment of the present invention may cache {B,C,D} with 18.75% confidence. By observing the table, those three requests seem to act in the most predictable way, whereas when A occurs there is some uncertainty. If only frequentist probabilities were used, the system would have also cached A which could possibly have led to overcaching. Addition ally, the probability using frequentist probabilities of the intersection of {A,B,C,D} is $18.74^4\% \approx 0.1\% \ll 18.75\%$. By leveraging transition probabilities, an embodiment of the present invention saves space in the cache and attributes greater confidence that the cache will be hit.

According to an embodiment of the present invention, user session information may be included in a Forecast response from the Application Prediction Engine service. Cache data may be based on user session time received from Application Prediction Engine service, instead of evicting the cache after 1 hour as in Phase-1. According to an embodiment of the present invention, user probability may be considered for cache invalidation. In addition, patterns for probability calculation (e.g., user repeating patterns alternative days/weeks/month) may be considered.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C#, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method that implements a prediction engine to provide predictive caching based on user behavior, the method comprising the steps of:
   capturing, via a data collection processor, usage data and session data from a user via a client interface executing an application;
   storing, via a prediction data storage, the usage data and session data;
   based at least in part on the captured usage data and session data, generating, via a prediction engine, a transition probability matrix applying a forecasting request load model to data sequences associated with the user that identifies prediction data, wherein the usage data includes a click path navigation indicating a particular sequence of clicks providing a sequence matrix and timing of the clicks;
   identifying an outlier based on the sequence matrix, and removing the outlier from the transition probability matrix to provide a modified transition probability matrix;
   creating a schedule, based on the modified transition probability matrix, that identifies a timeframe at which the predicted data will be required by the user;
   applying, via a task scheduler, the schedule to execute one or more tasks to cache data from an application database based on the schedule; and
   retrieving, via a cache processor, data based on the schedule, wherein the cache processor communicates with the user via a service layer associated with the application that executes a query service and a cache service based on a user request.

2. The method of claim 1, wherein the transition probability matrix represents local distribution of the user around a point on a particular day.

3. The method of claim 1, wherein the usage data comprises application identifier, project name, user identifier, session information and request parameters.

4. The method of claim 1, wherein the transition probability matrix is based on profile data that represents a compilation of user data with one or more similar characteristics.

5. The method of claim 1, further comprising the step of:
   providing feedback data through machine learning techniques to improve accuracy of the forecasting request load model.

6. The method of claim 1, further comprising the step of:
   transmitting, via an interactive interface, visualization data relating to the transition probability matrix.

7. The method of claim 1, wherein the usage data and session data is stored in the prediction data storage using a data storage model based on applications, users and actions.

8. The method of claim 1, wherein the prediction engine address the outlier by leveraging average usage patterns.

9. The method of claim 1, wherein the user request is encoded by a unique identifier by combining a hostname and URL parameters.

10. The method of claim 1, wherein the cache processor evicts data based on one or more conditions comprising: LRU (Least Recently Used) and data having less probability.

11. A system that implements a prediction engine to provide predictive caching based on user behavior, the system comprises:
   a data collection processor that captures usage data and session data from a user via a client interface executing an application;
   a prediction data storage that stores the usage data and session data; and
   a prediction engine that provides predictive caching for the user based on a timing of a user login, the prediction engine comprising a computer processor, coupled to the data collection processor and the prediction data storage and further programmed to perform the steps of:
      based at least in part on the captured usage data and session data, generating a transition probability matrix applying a forecasting request load model to data sequences associated with the user that identifies prediction data, wherein the usage data includes a click path navigation indicating a particular sequence of clicks providing a sequence matrix and timing of the clicks;
      identifying an outlier based on the sequence matrix, and removing the outlier from the transition probability matrix to provide a modified transition probability matrix;
      creating a schedule, based on the modified transition probability matrix, that identifies a timeframe at which the predicted data will be required by the user;
      applying, via a task scheduler, the schedule to execute one or more tasks to cache data from an application database based on the schedule; and
      retrieving, via a cache processor, data based on the schedule, wherein the cache processor communicates with the user via a service layer associated with the application that executes a query service and a cache service based on a user request.

12. The system of claim 11, wherein the transition probability matrix represents local distribution of the user around a point on a particular day.

13. The system of claim 11, wherein the usage data comprises application identifier, project name, user identifier, session information and request parameters.

14. The system of claim 11, wherein the transition probability matrix is based on profile data that represents a compilation of user data with one or more similar characteristics.

15. The system of claim 11, wherein the prediction engine is further programmed to perform the step of: providing feedback data through machine learning techniques to improve accuracy of the forecasting request load model.

16. The system of claim 11, wherein the prediction engine is further programmed to perform the step of: transmitting, via an interactive interface, visualization data relating to the transition probability matrix.

17. The system of claim 11, wherein the usage data and session data is stored in the prediction data storage using a data storage model based on applications, users and actions.

18. The system of claim 11, wherein the prediction engine address the outlier by leveraging average usage patterns.

19. The system of claim 11, wherein the user request is encoded by a unique identifier by combining a hostname and URL parameters.

20. The system of claim 11, wherein the cache processor evicts data based on one or more conditions comprising: LRU (Least Recently Used) and data having less probability.

\* \* \* \* \*